United States Patent Office 3,528,433
Patented Sept. 15, 1970

3,528,433
SMOKING PRODUCT HAVING
MICRORETICULATED FILTER
William R. Johnson, Jerome S. Osmalov, and Richard N. Thomson, Richmond, Va., assignors to Philip Morris Incorporated, New York, N.Y., a corporation of Virginia
No Drawing. Filed Mar. 21, 1968, Ser. No. 714,762
Int. Cl. A24d 1/04
U.S. Cl. 131—10.5                    5 Claims

ABSTRACT OF THE DISCLOSURE

A smoking product is disclosed having a porous microreticulated mass of interconnected aggregates of thermoplastic resin particles. The porous mass is made by mixing the thermoplastic resin particles with an organic liquid which is a non-solvent therefor to a temperature at which the resin fuses while maintaining the mixture under a pressure sufficient to maintain the liquid in a liquid phase.

Illustrative of porous plastic materials having a microscopic pore network are materials formed by combining particles of a thermoplastic resin, which may be a homopolymer, such as polyvinyl chloride, polyvinyl acetate, polyvinyl butyral, polyethylene, or homologues of such materials or may be a copolymer, such as copolymers of vinyl chloride and vinyl acetate, copolymers of vinyl chloride and propylene, copolymers of vinyl chloride and alkyl esters of maleic acid, or a terpolymer prepared from three monomers or compatible blends, such as blends of polyvinyl chloride and polymers of esters of acrylic and methacrylic acids or may be such other material which will perform the functions set forth in greater detail in this specification, with an organic liquid which is a non-solvent for the resin and heating the resulting mixture to a temperature at which the resin fuses, while maintaining the mixture under sufficient pressure to maintain the non-solvent at least partially in the liquid phase, whereby the resin particles fuse together forming an interconnected network of open spaces due to the presence of the non-solvent which fills the spaces. In the case of vinyl-type resins, Decalin (decahydronaphthalene) has been found to be a particularly effective non-solvent. Other materials, such as plasticizers, stabilizers and other materials, such as flavorants, may also be incorporated in the mixture, depending upon the particular results which are desired. After the resin particles have fused, the pressure is released and the non-solvent is removed from the pores of the material. A preferred method for romoving the non-solvent, particularly where decalin is employed as the non-solvent, is to contact the non-solvent-containing resin with a lower boiling material such as ethanol under reflux conditions. The resulting material may then be incorporated in a filter unit in various ways, for example by being comminuted for incorporation in a smoking article.

Other features of the invention appear in the following specification.

BACKGROUND OF THE INVENTION

Many materials have been suggested for filtration of tobacco smoke. Among some of the materials which have been employed as tobacco smoke filters are certain open-pore sponge or foam materials, and porous activated adsorbent materials, such as charcoals. Such materials have been used by themselves and in conjunction with papers, fibers, and other known filter materials. These materials, though effective in removing tobacco smoke components, nevertheless have not eliminated the need for a material which exhibits high filtration efficiencies at reasonable low resistances to draw.

The so-called open-cell foams, i.e., foams having an open-pore structure through which smoke may be drawn for filtration, have not generally been found to be effective in the removal of tobacco smoke components. In general, such foams are so open in structure that an inconveniently long filter section must be employed to effect significant particle removal. Moreover, the so-called open-cell foams have been found to possess some pores which are blocked, so that they contain useless dead space which does not interconnect with both ends of the filter.

On the other hand, the activated carbons have a pore size which is too fine for the effective removal of the particulate matter from tobacco smoke. Furthermore, such pores are not interconnected and, therefore, do not provide a good passageway for the tobacco smoke. Thus, to be effective, these materials generally are used in higher amounts with attendant high resistance to draw.

We have discovered certain novel filter elements which can provide filtration with an exceptionally high efficiency, at a desirable level of the RTD of filters in which they are employed. If desired, a filter element of our invention may be chosen to provide the proper retention and delivery to smoke of somewhat volatile additives and flavorants in addition to providing the proper retention of the less volatile constituents.

SUMMARY OF THE PRESENT INVENTION

The present invention relates to a smoking article having an improved filter and to methods of making the same. More particularly, the present invention relates to smoking articles embodying filters for tobacco smoke, which filters contain, as an essential filtering element, a plastic resin having an intricate pore structure. More particularly, the present invention relates to tobacco smoke filters containing, as an essential filtering element, a highly porous plastic material having an interconnected network of open spaces which are of microscopic proportions.

Illustrative of porous plastic materials having a microscopic pore network are materials formed by combining particles of a thermoplastic resin, which may be a homopolymer, such as polyvinyl chloride, polyvinyl acetate, polyvinyl butyral, polyethylene, or homologues of such materials or may be a copolymer, such as copolymers of vinyl chloride and vinyl acetate, copolymers of vinyl chloride and propylene, copolymers of vinyl chloride and alkyl ester of maleic acid, or a terpolymer prepared from three monomers or compatible blends, such as blends of polyvinyl chloride and polymers of esters of acrylic and methacrylic acids or may be such other material which will perform the functions set forth in greater detail in this specification, with an organic liquid which is a non-solvent for the resin and heating the resulting mixture to a temperature at which the resin fuses, while maintaining the mixture under sufficient pressure to maintain the non-solvent at least partially in the liquid phase, whereby the resin particles fuse together forming an interconnected network of open spaces due to the presence of the non-solvent which fills the spaces. In the case of vinyl-type resins, Decalin (decahydronaphthalene) has been found to be a particularly effective non-solvent. Other materials, such as plasticizers, stabilizers and other materials, such as flavorants, may also be incorporated in the mixture, depending upon the particular results which are desired. After the resin particles have fused, the pressure is released and the non-solvent is removed from the pores of the material. A preferred method for removing the non-solvent, particularly where decalin is employed as the non-solvent, is to contact the non-solvent-containing resin with a lower boiling material such as ethanol under reflux conditions. The resulting material may then be incorporated in a filter unit in various ways, for example by being comminuted for incorporation in a smoking article.

DESCRIPTION OF THE INVENTION AND ITS PREFERRED EMBODIMENTS

The porous plastic materials useful as the filter materials of the present invention may be prepared by a process wherein a thermoplastic synthetic resin and an organic liquid which is a non-solvent for the resin are heated together to a temperature at which the resin fuses under a pressure sufficient to maintain the liquid in the liquid phase within the structure. A plasticizer for the resin may also be present during the heating. Since the organic liquid present is a non-solvent for the resin, the resin particles or agglomerates of resin particles are held apart during the fusing. However, portions of the particles or agglomerates contact each other and form a structure composed of the resin particles adhered together to form interconnecting pores filled with the organic liquid.

The pore sizes which have been found to be most useful for the purposes of the present invention are from about 2 to 85 microns, and preferably from about 4 to 20 microns. The average pore diameter of the capillary pore systems of the present invention will generally be from 2 to 25 microns. To obtain a resin product with pore sizes in these ranges, the particle size of the resins employed may be from 0.05 to 100 microns, but should preferably be from about 0.2 to 20 microns in diameter.

In addition to the synthetic resin, plasticizer and non-solvent for the synthetic resin, there may be included optional ingredients of various types, such as flavorants and other materials which will, if desired, transfer from the resin to the smoke.

Illustrative of staring mixtures which may be employed in the present process, are those generally set forth in U.S. Pat. No. 2,777,824 and U.S. Pat. No. 3,055,297 and may be a dispersion or emulsion of the synthetic resin and plasticizer in the non-solvent organic liquid.

The synthetic resin structures which are employed in the present smoking products may be prepared by the process set forth in U.S. Pats. Nos. 2,777,824 and 3,055,-297. However, as will be set forth later in this specification, we have found that particularly preferred microreticulated structures can be made by a unique method which is not shown in either of said patents.

The resin structure can be formed of thermoplastic synthetic resins, which will, of course, constitute the major proportion of the structure. Typical synthetic resins include homopolymers, such as polyvinyl chloride, polyvinyl acetate, polyvinyl butyral, polyethylene, or homologues of such materials or copolymers, such as copolymers of vinyl chloride and vinyl acetate, copolymers of vinyl chloride and propylene, copolymers of vinyl chloride and alkyl esters of maleic acid, or a terpolymer prepared from three monomers of compatible blends, such as blends of polyvinyl chloride and polymers of esters of acrylic and methacrylic acids or may be such other material which will perform the functions set forth in greater detail later in this specification. Other types of thermoplastic resins may also be employed.

With the thermoplastic resins, there may be used a plasticizer for the resin. Many such plasticizers are known. Plasticizers which may be employed include methyl abietate, di-isooctyl adipate, 2-nitrobiphenyl, chlorinated biphenyl, glycerol triacetate, triethylene glycol di-2-ethylbutyrate, polyethylene glycol di-2-ephylhexoate, methyl phthalyl ethyl glycolate, butyl phthalyl butyl glycolate, aromatic hydrocarbon condensate, ethylene glycol monobutyl ether laurate, tetrahydrofurfuryl oleate, pentaerythritol tetrapropionate, cresyl diphenyl phosphate, tricresyl phosphate, dimethyl phthalate, diethyl phthalate, di-n-octyl phthalate, di-isooctyl phthalate, di-2-ethylhexyl phthalate, butyl ricinoleate, dibutyl sebacate, and ethylene glycol monobutyl ether stearate.

The plasticizer, when employed, will usually be used in an amount within the range from about 40 to about 160% by weight of the resin.

An essential ingredient for the preparation of the microreticulated structures employed in accordance with the present invenion is an organic liquid which is a non-solvent for the resin, i.e. a liquid in which the resin does not dissolve to any substantial degree. This non-solvent can be either volatile or non-volatile. Inasmuch as the structure of materials employed in accordance with this invention is porous to gases, any volatile solvents can generally be removed by heating the finished structure after completion. Usually it is preferred to employ a solvent which is readily retainable in the reaction mixture during formation of the structure. The more volatile the solvent, the greater the pressure that will have to be exerted to retain the solvent in the mixture until the structure has been formed.

Some non-solvent liquids which can be employed in accordance with the present invention include n-butyl alcohol, isoamyl alcohol, n-hexyl alcohol, 2-ethylhexyl alcohol, sec-heptadecyl alcohol, 4-tert-amylcyclo hexanol, glycol diacetate, butyl lactate, n-butyl ether, ethylene glycol mono-n-hexyl ether, diethylene glycol monoethyl ether, terpene methyl ethers, 2-methyl tetrahydrofuran, ethylene glycol, 1,2-propylene glycol, 1,3-butylene glycol, 2-methyl-2,4-pentanediol, diethylene glycol, triethylene glycol, amyl chloride, chloroform, cyclohexane, orthoxylene, metaxylene, paraxylene, diamylbenzene, amylnaphthalene, petroleum ether, gasoline, petroleum naphtha, aliphatic petroleum naphtha, heavy naphtha, petroleum spirits, kerosene, nitromethane and the like.

The microreticulated synthetic resin structures may be prepared by heating the mixture of synthetic resin, plasticizer and non-solvent for the resin to a temperature above the softening point of the resin, generally within the range from about 100 to about 250° F., while, if necessary, maintaining a sufficient pressure to retain the non-solvent in the mix. The time required will generally range from about one minute to one hour or more. In the course of heating, the resin emulsion or mixture is broken up and the resin particles will generally adhere together to form aggregates. The non-solvent fills up the pores between the resin aggregates which fuse together to form a larger mass of material having pores containing the non-solvent. In one preferred embodiment of the present process particles of a thermoplastic resin, which may be a homopolymer, such as polyvinyl chloride, polyvinyl acetate, polyvinyl butyrol, polyethylene, or homologues of such materials or may be a copolymer, such as copolymers of vinyl chloride and vinyl acetate, copolymers of vinyl chloride and propylene, copolymers of vinyl chloride and alkyl esters of maleic acid, or a terpolymer prepared from three monomers or compatible blends, such as blends of polyvinyl chloride and polymers of esters of acrylic and methacrylic acids or the like and a non-solvent for the resin comprising Decalin or dodecane into a homogeneous dispersion. The dispersion is heated at such a temperature that the resin fuses and the product is cooled to form a solid structure having the non-solvent dispersed therein. In the case of polyvinyl chloride, this temperature will be generally in the range of 140 to 200° C. and the heating will be for 25 to 60 minutes. The resulting solid structure with non-solvent dispersed through is then preferably cut or sliced into relatively small pieces and exposed to vapors of a second, low-boiling non-solvent for the resin, for example ethanol, methanol, n-propanol, isopropanol or water or a mixture of ethanol and water, to entrain and remove the plasticizer and the first non-solvent, and the solid is then dried. The non-solvent may also be removed by using counter-current extraction or by ultrasonic treatment with a low-boiling non-solvent. The remaining solid product is characterized by a microreticulated porous structure of a rigid, brittle or friable nature. The product is particularly useful in pulverized form as an unusually efficient smoke filter component. However, the product may also be used in many other forms, such as discs, rods and the like.

As set forth earlier in this specification, one general process of making a microreticulated polyvinyl chloride or similar resin incorporating a liquid therein is described generally in U.S. Pat. Nos. 2,777,824 and 3,055,297. The resin is pulverized and blended with plasticizer, stabilizer, and a non-solvent for the resin, together with desired additives such as flavorants, odorants, or the like, until a homogeneous mixture is obtained. This is heated at a temperature sufficient to fuse the resin and cooled. The product is employed without further treatment, or is subjected to reduced pressure and heating to remove most of the non-solvent. The structure of the product is one of microreticulated pores containing the non-solvent, together with the special additives. The resin portion retains the plasticizer and is soft and rubbery. It is resistant to being broken up into small granules. If reduced pressure has been applied, much of the non-solvent is removed, but a residue remains which clings tenaciously, and its odor is detectable. The non-solvents which have been used, moreover, leave a non-uniform distribution of pores, often with some virtually non-porous zones or with a scattering of large voids. Thus, while such a process may be employed to make the filters of the present invention, the preferred method set forth above provides greatly improved results.

The present improved method results in a product which is friable and capable of being readily broken or ground to small size, while retaining its microreticulated porous structure. The product so obtained is particularly suited for cigarette filters where the absence of residual odor is very important, and where the need for small manageable particles is met. It serves very well as a reservoir for flavors in the filter.

The non-solvent which is preferred for use in the present improved process is decalin, which we have found much more satisfactory with polyvinyl chloride for producing a uniform pore distribution, with neither non-porous areas nor voids. Decalin (decahydronaphthalene) is a colorless liquid which is miscible with alcohol and ether. It is generally used in an amount of 3 to 5 parts by weight per part of polyvinyl chloride resin.

After fusion has occurred, the product, which is resilient though usually firm, is preferably broken or cut into pieces not more than 1/8" thick, most preferably no more than 1/16" thick, and is exposed to the vapors of boiling ethanol in such a way that there is little or no vapor condensation on or in the resin; the ethanol vapors then entrain and carry away the non-solvent and plasticizer. One way to accomplish extraction with ethanol is to suspend the resin material in a wire mesh basket above the surface of refluxing ethanol in such a way that the condensate does not drip on the material. An exposure of three to four hours is sufficient to remove most of the plasticizer and the odor of Decalin. It has been observed that more than momentary contact of the material with hot liquid ethanol while the plasticizer is still present may cause deforming and closing of some pores. For this reason the zone containing the resin should preferably not be externally heated. The extracted resin is then preferably exposed for several hours in a drying oven at a temperature of from about 60° C. to remove traces of ethanol which may have been retained. Most preferably, the resin is placed in a vacuum oven maintained at reduced pressure at from room temperature to about 60° C. Low-boiling solvents other than ethanol which do not attack polyvinyl chloride, such as methanol, propanols, or water, may be employed in the extraction. However, ethanol is preferred when the product is to be used in smoking articles where residual traces might reach the user. From an economic viewpoint, water is also a preferred solvent.

During any of the methods disclosed above for the preparation of the microreticulated material which is employed in the filters of the present invention, the step of heating the resin particles in the presence of a non-solvent, such as Decalin, should preferably be conducted in the absence of air, either by being conducted in the presence of an inert atmosphere, such as nitrogen, or by excluding air by the use of liquid non-oxidizing material such as the Decalin or other non-solvent. Subsequent processing of the material will not generally involve the use of an inert atmosphere or the absence of oxygen.

We have found that the ideal pore size for use in accordance with the present invention is from 2 to 20 microns in diameter, on the average, and for best filtration of tobacco smoke, the most preferred pore size of the present product is from 4 to 20 microns in diameter. In the most preferred pore size distribution, no more than 15% of the pores are smaller than 3.5 microns in diameter.

We have also found that the product is most advantageously employed in filters for tobacco smoke in the form of particles which may be from 40 mesh to 80 mesh in size. The material may also be employed, however, in the form of strips, sheets, and other irregular shapes.

The micro porous materials of the present invention are preferably not so tightly packed in a filter for tobacco smoke that passages are not provided for the smoke to pass therethrough, even though the pores have been found to be sufficiently large and to permit natural drawing of smoke through the resin agglomerate itself. Thus, tobacco smoke filters incorporating the resin product of the present invention should preferably be so constructed that the smoke can pass through and around particles of the product or past surfaces of the product in any desired shape or form. Filters incorporating the present product should preferably be so constructed that, when combined with tobacco in a cigarette, the resulting product has a resistance-to-draw of from about 2 to 8 and preferably no higher than about 5. Resistance-to-draw is defined as follows:

A vacuum system is set to puff an air flow of 1050 cc./min. by inserting the tapered end of a standard capillary tube through the dental dam of the cigarette holder and adjusting the reading on the water manometer to the correct RTD. The water level of the manometer is set at zero before inserting the standard capillary.

Then, the butt end of a cigarette or plug is inserted to a depth of 5 mm. in the dental dam of the cigarette holder. The pressure drop behind this cigarette with 1050 cc./min. of air flow passing through is read directly as RTD (inches water) from the inclined water manometer.

The following examples are illustrative:

EXAMPLE 1

One part of brand resin polyvinyl chloride resin, sold by B.F. Goodrich as "Geon" 121, particles was sieved to —200 +275 mesh and was mixed with one part of di-(2-ethylhexyl) phthalate by grinding the mixture with a mortar and pestle until a homogeneous plastisol was formed. As a heat stabilizer, 0.1 part of tribasic lead sulfate, $3PbO.PbSO_4.H_2O$, produced by National Lead Co., was added, and four parts of Decalin, was blended in by means of a homogenizer. The resulting emulsion was poured into a glass tube which was then immersed in solid carbon dioxide. The free space was purged with dry nitrogen and the tube was sealed.

It was heated in an oven for 45 minutes after the temperature of the oven had regained 176° C.; the maximum temperature was 183° C. After cooling, the tube was opened and the product withdrawn as a firm but resilient rod. This was sliced into wafers from 1/8 to 1/16" thick and exposed in a wire basket over boiling ethanol for four hours. The heating mantle heated the basket zone as well as the ethanol, while the vapor was condensed overhead and returned along the sides to the vessel.

The product was dried in a vacuum oven at about 10 mm. pressure and 50° C. for four hours. Microscopic examination showed that the pores were found uniformly distributed throughout the mass and were in a very narrow range of 4 to 15 microns in diameter, averaging 5 microns. The brittle product could be broken up into small particles which maintained the porous structure.

The product was crushed by treatment in a Waring Blendor and sieved to —40 +80 mesh. Weighed quantities were introduced into a space adjacent to the 65 mm. tobacco rod of a commercial cigarette and a back-up filter of 5 denier/68000 cellulose acetate which had been cut to give a total 85 mm. length was attached to hold the polymer in place. The cigarettes were smoked by machine with the results tabulated in Table I.

TABLE I.—MICRORETICULATED POLYVINYL CHLORIDE IN CIGARETTE FILTER

| PVC, mg. | Cigarette RTD, in. | TPM, mg. | Filter efficiency, percent |
|---|---|---|---|
| 100 | 5.0 | 15.5 | 63 |
| 100 | 7.0 | 10.1 | 75 |
| 150 | 9.0 | 8.6 | 84 |
| 150 | 11.0 | 3.5 | 92 |
| No filter (control) | 2.4 | 41.2 | |

When xylene was used in place of Decalin in the above process, the products were found to be either non-porous or were non-uniform, often with non-porous zones, and were not suitable as tobacco smoke filters.

EXAMPLE 2

"Bakelite" QYNA–1 brand polyvinyl chloride resin, —80 +100 mesh, sold by Union Carbide Plastics Co., was blended in the proportions of Example 1 with di-(2-ethylhexyl) phthalate, Decalin and tribasic lead sulfate by the same procedures, and sealed in a tube as described in Example 1. Heating was conducted for 45 minutes at a temperature of from 176° C. to 183° C. The product was cut into 1/16" slices and exposed to ethanol vapors for four hours and thereafter dried at room temperature and 5 mm. absolute pressure. The dried product was brittle and crumbled easily. Pore sizes ranged from 200 to 300 microns and were uniformly distributed, with a scattering of 2.5 micron pores.

This product was crushed by treatment in a Waring Blendor and sieved to —40 +80 mesh. Weighed quantities were introduced into a space adjacent to the 65 mm. tobacco rod of a commercial cigarette and a back-up filter of 5 denier/68000 cellulose acetate which had been cut to give a total 85 mm. length was attached to hold the polymer in place.

EXAMPLE 3

Commercial polyvinyl chloride, "Bakelite" QYNA–1 brand, sold by Union Carbide Plastics Co., sieved at +200 —275 mesh, was mixed with an equal part by weight of di-(2-ethylhexyl) phthalate and thoroughly worked with mortar and pestle until a plastisol was formed. As a heat stabilizer, 0.1 part of "Tribase" tribasic lead sulfate, $3PbO \cdot PbSO_4 \cdot H_2O$, sold by National Lead Co., was blended in. Four parts of Decalin, reagent grade, was added and the mixture was treated in a homogenizer until an emulsion was formed. The emulsion was poured into a glass tube which was then purged with nitrogen, immersed in solid carbon dioxide, and sealed.

The tube was placed in an oven and heated for 45 minutes after the oven had reached 176° C. (maximum temperature 183° C.), removed, and cooled. The product was sliced to form pieces about 1/16" thick, was exposed to ethanol vapors to displace the Decalin and plasticizer and finally dried under vacuum at room temperature to remove residual ethanol. Microscopic examination showed a very uniform pore size distribution, the range of diameters being from 5 to 80 microns and averaging 15 microns.

This product was crushed by treatment in a Waring Blendor and sieved to —40 +80 mesh. Weighed quantities were introduced into a space adjacent to the 65 mm. tobacco rod of a commercial cigarette and a back-up filter of 5 denier/68000 cellulose acetate which had been cut to give a total 85 mm. length was attached to hold the polymer in place.

The cigarettes were smoked by machine with results tabulated in Table II.

TABLE II.—MICRORETICULATED POLYVINYL CHLORIDE IN CIGARETTE FILTER

| PVC, mg. | Cigarette RTD, in. | TPM, mg. | Filter efficiency, percent |
|---|---|---|---|
| 60 | 6.4 | 13.9 | 65 |
| 150 | 10.0 | 6.6 | 83 |
| No filter | 2.4 | 40 | |

EXAMPLE 4

"Bakelite" VYNW–5 brand polyvinyl choride vinyl acetate copolymers was sieved to —200 +275 mesh and was mixed with four parts of Decalin and 0.1 part of tribasic lead sulfate, and the mixture was homogenized and poured into a metal Carious tube 1 inch I.D. x 6 inches long which was flushed with nitrogen and screw-capped. The tube was heated for 45 minutes at 176° C. to 183° C., cooled, and opened. The product was quite firm and hard, lacking the resilience of the plasticized material.

The product was sliced and extracted with ethanol vapors for four hours, then dried four hours under vacuum at room temperature.

The product was brittle and pluverulent. It has a uniform distribution of pores from 8 to 60 microns in diameter with an average size of 24 microns. The fusion appeared equal to that achieved in the presence of plasticizer, and the product, except for pore size, was equivalent.

This product was crushed by treatment in a Waring Blendor and sieved to —40 +80 mesh. Weighed quantities were introduced into a space adjacent to the 65 mm. tobacco rod of a commercial cigarette and a back-up filter of 5 denier/68000 cellulose acetate which had been cut to give a total 85 mm. length was attached to hold the polymer in place.

The cigarettes were smoked by machine with results tabulated in Table III.

TABLE III.—MICRORETICULATED POLYVINYL CHLORIDE IN CIGARETTE FILTER

| PVC, mg. | Cigarette RTD, in. | TPM, mg. | Filter efficiency, percent |
|---|---|---|---|
| 150 | 8.0 | 19.4 | 65 |
| 150 | 11.0 | 14.2 | 75 |
| No filter | 2.4 | 55.5 | |

It will be seen from this example that it is possible to achieve satisfactory fusion without a plasticizer.

EXAMPLE 5

A mixture of 50 parts of polyvinyl chloride (—300 mesh), 5 parts of tribasic lead sulfate, and 50 parts of dioctyl phthalate was blended with 100 parts of glycerol monoricinoleate and 10 parts of geraniol. This mixture was placed in a narrow, flat mold having a cavity about 1 mm. in width. The mold was heated to about 300°–350° F. for 10 to 25 minutes, cooled and opened. The resulting sheet of porous resin was supplied with uniform pores slightly less than one micron in diameter filled with liquid; it was cut into shreds by use of a sharp blade and very little pressure, and 0.2 g. of the material was placed in an open space in a cigarette filter adjacent to the tobacco rod, with a 15 mm. long cellulose acetate filter plug occupying the remainder of the filter section.

When this cigarette was smoked it had a delightful and sweet aroma; before smoking, the odor of geraniol was barely detectable.

EXAMPLE 6

Commercial polyvinyl chloride "Geon" 121 brand, sold by B. F. Goodrich Chemical Co., was mixed with an equal part by weight of di-(2-ethyl hexyl) phthalate and thoroughly worked with a mortar and pestle until a plastisol was formed. Four parts of Decalin, reagent grade, was added and the mixture was treated in a homogenizer until an emulsion was formed. The emulsion was placed in a 250 ml. capped Carius tube, purged with nitrogen and the cap sealed.

The tube was paced in an oven and heated for 45 minutes after the oven had reached 178° C., removed and cooled at room temperature. The product was sliced to form pieces about ⅛″ thick, was exposed to ethanol vapors to displace the Decalin and plasticizer and finally dried under vacuum at 60° C. to remove residual ethanol. Microscopic examination showed a very uniform distribution of pores throughout the material. The range of pore diameters was 2 to 80 microns with an average of 10 microns.

This product was crushed by treatment in a Waring Blendor and sieved to −40 +80 mesh. Weighed quantities were introduced into a space adjacent to the 65 mm. tobacco rod of a commercial cigarette and a back-up filter of 5 denier/6800 cellulose acetate which had been cut to give a total cigarette length of 85 mm. was attached to hold the polymer in place.

The cigarettes were smoked by machine with results tabulated in Table IV.

TABLE IV.—MICRORETICULATED POLYVINYL CHLORIDE IN CIGARETTE FILTER

| PVC, mg. | Cigarette RTD, in. | TPM, mg. | TPM without filter mg. | Filter efficiency, percent |
|---|---|---|---|---|
| 100 | 5.3 | 10.4 | 41.2 | 75 |
| 100 | 8.0 | 6.6 | 48.2 | 86 |
| 50 | 5.0 | 9.1 | 35 | 74 |
| 50 | 4.5–5.5 | 8.0 | 33.3 | 76 |

EXAMPLE 7

Example 6 was followed except that a resin, Pliovic AO–1, sold by Goodyear Rubber Inc., was used as the polymeric material and a fusion temperature of 164° C. was used. The pore sizes ranged from 2 to 80 microns with an average pore size of 16 microns.

Smoking as described in previous examples yielded a filtration efficiency of 73% at 5 inches RTD with a 75 mg. loading of material in the filter.

We claim:

1. A tobacco product comprising a tobacco section and a filter section, said filter section comprising a thermoplastic resin having a microporous structure comprising interconnected aggregates of united particles of a thermoplastic synthetic resin, the aggregates defining a reticular capillary pore system extending from surface to surface of the structure, said capillary pore system having an average pore diameter of from 2 to 25 microns, said resin having its microreticulated structure formed by heating a mixture comprising a thermoplastic resin and an organic liquid which is a non-solvent therefor to a temperature at which said resin fuses while maintaining the mixture under a pressure sufficient to maintain said liquid in a liquid phase until a microreticulated structure is formed and thereafter removing the said non-solvent.

2. The tobacco product of claim 1 wherein said thermoplastic resin is selected from the group consisting of polyvinyl chloride, polyvinyl acetate, polyethylene, polyvinyl butyral, copolymers of vinyl chloride and alkyl substituted maleates, copolymers of vinyl chloride and vinyl acetate and mixtures of the same, and copolymers of vinyl chloride and esters of acrylic and methacrylic acids.

3. The tobacco product of claim 1 wherein said thermoplastic resin is a vinyl chloride resin.

4. The tobacco product of claim 3 wherein said vinyl chloride resin is polyvinyl chloride.

5. The tobacco product of claim 3 wherein said vinyl chloride resin is a copolymer of vinyl chloride.

References Cited

UNITED STATES PATENTS

| 3,039,908 | 6/1962 | Parmele | 131—267 X |
| 2,983,692 | 5/1961 | D'Alelio | 260—2.5 |
| 3,217,715 | 11/1965 | Berger et al. | 131—265 X |
| 3,409,020 | 11/1968 | Westbrook et al. | 131—269 X |

FOREIGN PATENTS

| 908,185 | 10/1962 | Great Britain. |

MELVIN D. REIN, Primary Examiner

U.S. Cl. X.R.

131—269

FO-1050
(5/69)

UNITED STATES PATENT OFFICE
CERTIFICATE OF CORRECTION

Patent No. 3,528,433    Dated September 15, 1970

Inventor(s) William R. Johnson, Jerome S. Osmalov, Richard N. Thomson

It is certified that error appears in the above-identified patent and that said Letters Patent are hereby corrected as shown below:

Col. 2, line 1.   Change "reasonable" to --reasonably--
Col. 3, line 34.  Change "staring" to --starting--
Col. 3, line 66.  Change "di-2-ephyl-" to --di-2-ethyl- --

Col. 4, line 48.  Change "butyrol" to --butyral--

Col. 6, line 25.  Change "micro porous" to --microporous--

Col. 7, line 57.  Change "+200" to -- -200 --

Col. 8, line 25.  Change "Carious" to --Carius--

Col. 8, line 34.  Change "pluverulent" to --pulverulent--

Signed and sealed this 14th day of September 1971.

(SEAL)
Attest:

EDWARD M. FLETCHER, JR.          ROBERT GOTTSCHALK
Attesting Officer                Acting Commissioner of Patents